US009422165B2

(12) United States Patent
Thevasaharam

(10) Patent No.: US 9,422,165 B2
(45) Date of Patent: Aug. 23, 2016

(54) GRAPHENE COMPOSITIONS AND METHODS OF MAKING THE SAME

(75) Inventor: Arockiadoss Thevasaharam, Tamilnadu (IN)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 14/397,302

(22) PCT Filed: Aug. 10, 2012

(86) PCT No.: PCT/IB2012/054076
§ 371 (c)(1),
(2), (4) Date: Oct. 28, 2014

(87) PCT Pub. No.: WO2013/160736
PCT Pub. Date: Oct. 31, 2013

(65) Prior Publication Data
US 2015/0093324 A1  Apr. 2, 2015

(30) Foreign Application Priority Data
Apr. 27, 2012  (IN) .......................... 1665/CHE/2012

(51) Int. Cl.
| *C01B 31/04* | (2006.01) |
| *C01B 31/20* | (2006.01) |
| *B01J 37/02* | (2006.01) |
| *B01J 23/652* | (2006.01) |
| *C01B 13/02* | (2006.01) |
| *B01J 37/03* | (2006.01) |
| *B01J 37/34* | (2006.01) |
| *B01J 35/00* | (2006.01) |

(52) U.S. Cl.
CPC ......... *C01B 31/0446* (2013.01); *B01J 23/6527* (2013.01); *B01J 35/004* (2013.01); *B01J 37/0225* (2013.01); *C01B 13/0237* (2013.01); *C01B 31/043* (2013.01); *C01B 31/0476* (2013.01); *C01B 31/20* (2013.01); *B01J 35/0033* (2013.01); *B01J 37/036* (2013.01); *B01J 37/347* (2013.01); *C01B 2204/02* (2013.01); *C01B 2204/22* (2013.01)

(58) Field of Classification Search
CPC  C01B 31/0446; C01B 31/0453; B82Y 30/00; C23C 16/26; C23C 16/0281
See application file for complete search history.

(56) References Cited

U.S. PATENT DOCUMENTS

| 2,798,878 | A | 7/1957 | Hummers, Jr. | |
| 7,824,651 | B2 | 11/2010 | Zhamu et al. | |
| 2009/0110627 | A1* | 4/2009 | Choi | B82Y 30/00 423/447.1 |
| 2010/0266964 | A1* | 10/2010 | Gilje | B82Y 30/00 430/322 |
| 2011/0014368 | A1 | 1/2011 | Vasenkov | |

(Continued)

FOREIGN PATENT DOCUMENTS

WO  WO2013/160736 A1  10/2013

OTHER PUBLICATIONS

Williams, Graeme, Brian Seger, and Prashant V. Kamat. "TiO2-graphene nanocomposites. UV-assisted photocatalytic reduction of graphene oxide." ACS nano 2.7 (2008): 1487-1491.*

(Continued)

*Primary Examiner* — Richard M Rump
(74) *Attorney, Agent, or Firm* — Pepper Hamilton LLP

(57) ABSTRACT

Compositions comprising graphene and methods for preparing graphene are described.

22 Claims, 3 Drawing Sheets

(56) References Cited

U.S. PATENT DOCUMENTS

2011/0052813 A1    3/2011    Ho et al.
2011/0108609 A1    5/2011    Woo et al.

OTHER PUBLICATIONS

International Search Report and Written Opinion for PCT/IB2012/054076 dated Jan. 22, 2013.
Arai et al., Complete oxidation of acetaldehyde and toluene over a Pd/WO$_3$ photocatalyst under fluorescent- or visible-light irradiation, *Chem. Commun.* (2008), 5565-5567.
Cote et al., Langmuir-Blodgett Assembly of Graphite Oxide Single, *J. Am. Chem. Soc.* (2009), 131:1043-1049.
Graphite powder, synthetic, conducting grade, -200 mesh, 99.9995% (metals basis), http://www.alfa.com/en/GP100W.pgm?DSSTK-40797, accessed online Sep. 26, 2014.
Huh, Thermal Reduction of Graphene Oxide, *Physics and Applications of Graphene—Experiments* (Apr. 19, 2011), Chapter 5, pp. 73-90.
International meeting on the chemistry of nanotubes and graphene, Arcachon, France (Apr. 1-5, 2012).
Jiang et al., A highly efficient chemical sensor material for ethanol: Al$_2$O$_3$/Graphene nanocomposites fabricated from graphene oxide, *Chem. Comm.* (2011), 47:6350-6352.
Li et al., Evolution of Graphene Growth in Ni and Ci by Carbon Isotope Labeling, *Nano Letters* (2009), 9(12):4268-4272.
Mattevi et al., A review of chemical vapour deposition of graphene on copper, *J. Mater. Chem.* (2011), 21:3324-3334.
Zhang et al., Controlled synthesis of few-layered graphene sheets on a large scale using chemical exfoliation, *Carbon* (Feb. 25, 2010), 48:2361-2380.
Zheng et al., Metal-catalyzed crystallization of amorphous carbon to graphene, *Applied Physics Letters* (2010), 96:063110:1-063110:3.

* cited by examiner

A

B

C

A

B

GRAPHENE COMPOSITIONS AND METHODS OF MAKING THE SAME

CROSS-REFERENCE TO RELATED APPLICATIONS

This application is a 35 U.S.C. §371 national phase application of PCT Application No. PCT/IB2012/054076, filed Aug. 10, 2012, entitled "GRAPHENE COMPOSITIONS AND METHODS OF MAKING THE SAME," which claims priority to Indian Patent Application No. 1665/CHE/2012, filed Apr. 27, 2012, entitled "GRAPHENE COMPOSITIONS AND METHODS OF MAKING THE SAME," each of which is hereby incorporated by reference in its entirety.

FIELD

Methods for producing graphene compositions and sheets are described.

BACKGROUND

Generally, graphite is a multi-layered stack of two-dimensional graphene sheets formed from a planar array of carbon atoms bonded into hexagonal structures. Single-layered or multi-layered graphene sheets have beneficial properties in the area of electrical conductivity. Often the graphene is densely packed in a honeycomb crystal lattice. Graphene is used and is expected to be used in many industrial and consumer products and services. Embodies disclosed herein provide methods of making graphene, such as large area graphene, and the like.

SUMMARY

In some embodiments, methods of preparing graphene are provided. In some embodiments, the method comprises contacting a graphitic oxide composition with a photocatalytic-coated metal substrate to yield graphene, wherein the graphitic oxide composition comprises graphitic oxide and an organic solvent.

In some embodiments, the method comprises preparing the graphitic oxide composition. In some embodiments, the method of preparing the graphitic oxide composition comprising dissolving graphite in a concentrated acid to produce an graphite-acid solution; contacting the graphite-acid solution with a nitrate or salt thereof to yield a graphite-acid-nitrate solution; contacting the graphite-acid-nitrate solution with an oxidizer to yield the graphitic oxide; purifying the graphitic oxide; and/or dissolving the purified graphitic oxide in the organic solvent to produce the graphitic oxide composition.

In some embodiments, the method comprises isolating the graphene.

In some embodiments, graphene is provided that is made according to a method described herein.

DETAILED DESCRIPTION

Figure 1:
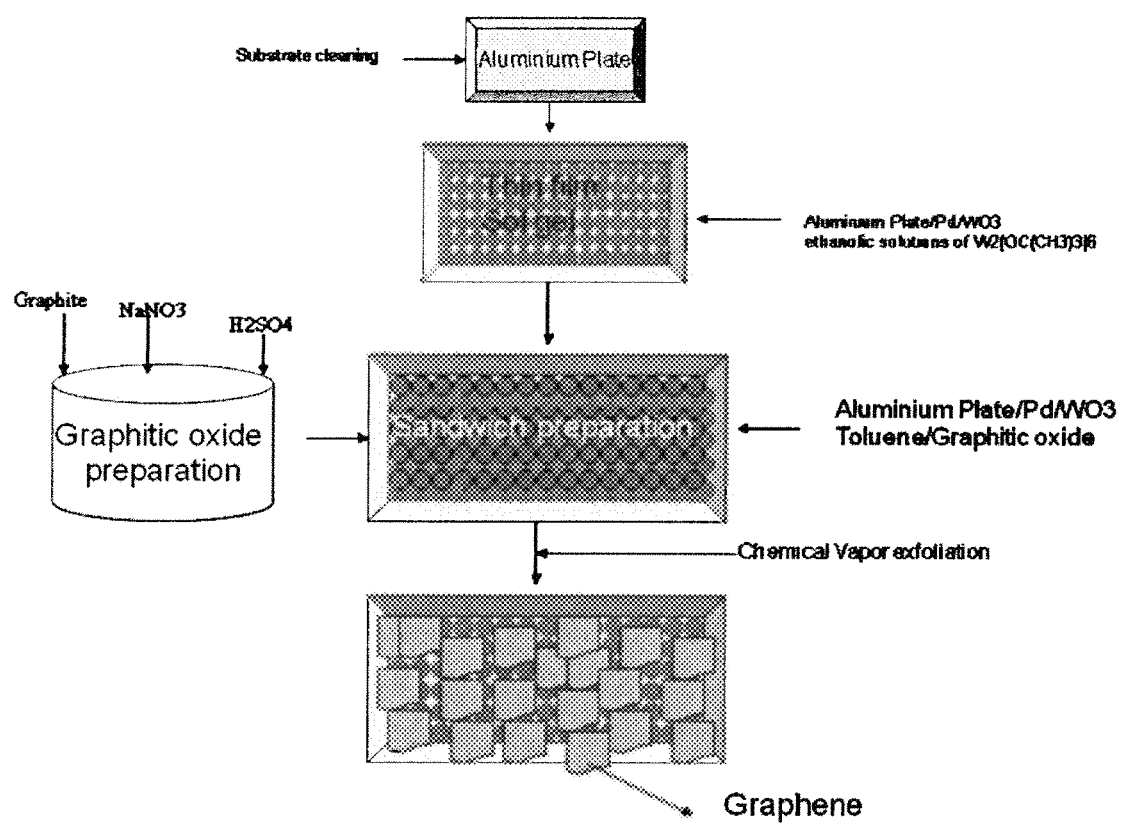
FIG. 1 shows a non-limiting schematic for the production of graphene according to the methods described herein.

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Embodiments provide methods of preparing graphene. In some embodiments, the method comprises reacting or contacting a graphitic oxide composition with a photocatalytic-coated metal substrate to yield graphene. The photocatalytic-coated metal substrate can be any metal that is able to conduct electricity or electrons. Examples of the metal substrate include, but are not limited to, copper, aluminum, gold, silver, iron, zinc and the like, or a combination thereof. In some embodiments, the metal substrate comprises a silicon wafer or a zinc plate. The metal substrate is not limited to pure metal, but can be an alloy or mixture of metals, such as a mixture of the metals described herein. In some embodiments, the graphitic compositions comprise graphitic oxide and an organic solvent. In some embodiments, the organic solvent is a volatile organic solvent. Examples of organic solvents include, but are not limited to toluene, ethyl acetate, glycol ethers, acetone, and the like. The solvents can also be used in any combination. The size of the substrate can also be any size suitable for the production of graphene. The size of the substrate can be any size. The size of the substrate, however, is usually determined by the size of the light source. The light source should be uniform. Therefore, the size of the substrate can be from 1 cm$^2$ to many square meters. For example, if a 4 square meter uniform light source is used it can be used to produce a 4 square meter graphene sheet. Thus, the limits on the size of the sheet will correlate with the size of the light source. The light source need not be the same size of as the graphitic oxide, but the size of the light source will produce the same size of graphene sheet. That is, if the light source produces light that is less than the surface area of the graphitic oxide, the size of the graphene sheet will also be less. Accordingly, in some embodiments, the size of the light source is the same as the area of the graphitic oxide. The substrate or the sheet is also not limited based upon its geometric shape. The substrate can be a disc, circle, oval, triangle, or any other shape. The substrate need not be square or rectangular.

In some embodiments, the graphitic oxide composition is coated on the photocatalytic coated metal substrate. The graphitic oxide composition can be coated on to the photocatalytic coated metal substrate by any method. The method can, for example, provide a layer having uniform thickness or substantially uniform thickness of the graphitic oxide composition. In some embodiments, the photocatalytic coated metal substrate is coated with the graphitic oxide composition by spin coating the photocatalytic coated metal substrate with the graphitic oxide composition. Other methods can also be used to coat the substrate. In some embodiments, the substrate is coated by dip coating, spray coating, or sol-gel. The method of coating is not essential and can also include, but is not limited to, sputtering or chemical vapor deposition (CVD) processes.

Embodiments provided herein describe a photocatalytic coated metal substrate. Examples of a photocatalytic that can be coated onto a metal substrate include, but are not limited to, $Pd/WO_3$, ZnO, Ru, $TiO_2$, Pt, or any combination thereof. In some embodiments, the photocatalytics can be doped.

In some embodiments, the method of preparing graphene comprises heating the graphitic oxide composition and the photocatalytic-coated metal substrate to a temperature of about 50° C. In some embodiments, the temperature is about 45° C. to about 85° C., about 45° C. to about 80° C., about 45° C. to about 75° C., about 45° C. to about 70° C., about 45° C. to about 65° C., about 45° C. to about 60° C., about 45° C. to about 55° C., or about 45° C. to about 50° C. Specific examples of temperatures include about 40° C., about 50° C., about 60° C., about 70° C., about 80° C., and ranges between any two of these values. In some embodiments, the graphitic oxide composition and the photocatalytic-coated metal substrate is heated to a specified temperature, such as but not limited to the temperatures described herein, at a rate of about 1, 2, 3, 4, 5, 6, 7, 8, 9, or 10° C. per minute. In some embodiments, the graphitic oxide composition and the photocatalytic-coated metal substrate is maintained at the specified temperature for about 1 to about 20, about 1 to about 15, about 1 to about 10, about 5 to about 20, about 5 to about 15, about 5 to about 10, about 10 to about 20, or about 10 to about 15 minutes. Specific examples of the time duration include about 5 minutes, about 10 minutes, about 15 minutes, about 20 minutes, and ranges between any two of these values.

In some embodiments, the reacting or contacting the graphitic oxide composition with the photocatalytic coated metal substrate by exposing the graphitic oxide composition and the photocatalytic-coated metal substrate to light to yield the graphene. The graphitic oxide composition can be reacted until all layers of graphene can be prepared or extracted from the graphite stack. In some embodiments, the graphitic oxide composition is reacted with the photocatalytic-coated metal substrate by contacting the graphitic oxide and the photocatalytic-coated metal substrate with oxygen ($O_2$). In some embodiments, the reacting or contacting is done in the presence of an inert gas. In some embodiments, the reacting or contacting is done at a temperature less than about 60° C. In some embodiments, the reacting or contacting is done at a temperature of about 45° C. to about 85° C., about 45° C. to about 80° C., about 45° C. to about 75° C., about 45° C. to about 70° C., about 45° C. to about 65° C., about 45° C. to about 60° C., about 45° C. to about 55° C., about 45° C. to about 50° C., about 50° C. to about 85° C., about 50° C. to about 80° C., about 50° C. to about 75° C., about 50° C. to about 70° C., about 50° C. to about 65° C., about 50° C. to about 60° C., about 50° C. to about 55° C., about 55° C. to about 85° C., about 55° C. to about 80° C., about 55° C. to about 75° C., about 55° C. to about 70° C., about 55° C. to about 65° C., about 55° C. to about 60° C., about 60° C. to about 85° C., about 60° C. to about 80° C., about 60° C. to about 75° C., about 60° C. to about 70° C., or about 60° C. to about 65° C. Specific examples of temperatures include about 40° C., about 50° C., about 60° C., about 70° C., about 80° C., and ranges between any two of these values.

In some embodiments, the methods disclosed herein comprise isolating the graphene. For example, the graphene can be produced by allowing toluene and oxygen to react to create water and carbon dioxide, which causes the graphitic oxide to exfoliate to graphene when done in the presence of oxygen and optical radiation (e.g. exposure to a light source). Thus in some embodiments, graphitic oxide (GO) is dipped (e.g. mixed) with toluene. Without wishing to be bound to any theory, the toluene seeps or fills in the spaces between the graphitic oxide layers. Then in the presence of light and the catalyst (e.g. $Pd/WO_3$), toluene becomes oxidized and oxygen gas is liberated from the GO. This process results in the formation of oxygen gas, $CO_2$ gas, $H_2O$, and graphene flakes. The water can prevent the restacking of the graphene flakes. The flakes can then aggregate with one to another to form a sheet of graphene. The graphene is then isolated through exfoliation.

In some embodiments, the graphene that is prepared is a sheet of graphene. The size of the graphene can correlate with the size of the substrate and the size of light source. The larger the light source the larger the graphene sheet can be.

In some embodiments, the graphene has a high electrical conductivity. In some embodiments, the electrical conductivity is about $1.3 \times 10^3$ S/m. In some embodiments, the electrical conductivity is at least or greater than $1.3 \times 10^3$ S/m. In some embodiments, the electrical conductivity can be increased by using higher purity chemicals.

In some embodiments, the method comprises preparing the graphitic oxide composition. In some embodiments, the method of preparing the graphitic oxide composition comprises dissolving graphite in a concentrated acid to produce a graphite-acid solution. Suitable acids include, but are not limited to, sulfuric acid nitric oxide, or any combination thereof. In some embodiments, the acid has a pH of less than or equal to about 4.0, about 3.0, about 2.0, or about 1.0. In other embodiments, the acid has a pH of about 4.0, about 3.0, about 2.0, about 1.0, or ranges between any two of these values.

In some embodiments, preparing the graphitic oxide composition comprises contacting the graphite-acid solution with a nitrate, a salt, or a combination thereof to yield a graphite-acid-nitrate (or salt) solution. An example of a nitrate includes, but is not limited to, sodium nitrate, potassium nitrate, ammonium nitrate, or any combination thereof. Examples of a salt includes, but is not limited to KCl, $KMnO_4$, KI, $MgBr_2$, $NaBH_4$, $I_2O_5$, and the like.

In some embodiments, the graphite-acid solution is contacted with a nitrate or salt thereof in an ice bath to yield the graphite-acid-nitrate solution. In some embodiments, the graphite-acid solution is contacted with a nitrate or salt thereof at a temperature less than or equal to about 20, 15, 10, 5, 4, 3, 2, 1, or 0 degrees Celsius, or ranges between any two of these values.

In some embodiments, the method of preparing the graphitic oxide composition comprises reacting or contacting the graphite-acid-nitrate (or salt) solution with an oxidizer to yield the graphitic oxide. The oxidizer can be any oxidizer suitable to yield the graphitic oxide. In some embodiments, the oxidizer is hydrogen peroxide, hydrazine, persulfuric acid, perchlorate, hypochlorite or any combination thereof.

In some embodiments, the method of preparing the graphitic oxide composition comprises purifying the graphitic oxide. In some embodiments, the method further comprises dissolving the purified graphitic oxide in an organic solvent to produce the graphitic oxide composition. The graphitic oxide can be purified by any method, including but not limited to, filtering, centrifugation, and the like. Purification methods can also be combined to purify the graphitic oxide.

The embodiments described herein provide surprising and unexpected advantages over other methods of preparing graphene. For example, in some embodiments, the process can be automated. The automation allows the presently described methods to be scaled for industrial and other applications. The present methods also do not require the use of special alloys. Accordingly, in some embodiments, the method does not use a metal composition that is an alloy. The methods also do not require a transfer process to obtain the free standing graphene sheet. Accordingly, in some embodiments, the method does not comprise a transfer process. Another surprising and unexpected advantage is that the methods can be run at a lower temperature, such as those described herein. Other surprising and unexpected advantages include, but are not limited to, that the catalytic surface can be reused, which enables the methods to be performed more efficiently and at a lower cost. Additionally, the method does not require toxic chemicals or a chemical treatment such as $FeCl_3$ or similar acid type compound. Accordingly, in some embodiments, the method does not comprise chemically treating the compositions to produce graphene. In some embodiments, the method does not comprise treating the graphitic oxide with $FeCl_3$.

FIG. 1 shows a non-limiting schematic of how the graphene can be prepared. FIG. 1 shows an aluminum plate that is coated with the photocatalytic substrate by the sol-gel method. The photocatalytic plate is then coated with graphitic oxide composition which is then heated according to the methods described herein and exposed to visible light to yield graphene. This schematic can be used as a non-limiting example of how a system can be set up to yield large amounts of graphene. Therefore in some embodiments, a system is provided that comprises an apparatus for depositing the photocatalytic substrate onto a metal substrate; an apparatus for depositing the graphitic oxide composition onto the photocatalytic coated metal substrate. The system can also comprise a heater to heat the graphitic oxide composition coated sheet and a window or other opening that can be used to expose the sheet to visible light to produce the graphene or graphene sheets.

EXAMPLES

Example 1

Preparation of Graphitic Oxide 5 grams of graphite (200 mesh) was dissolved in sulfuric acid (pH approximately 1.5, 50 mL). 23 grams of $NaNO_3$ is added to the solution. The solution was stirred in an ice bath for 15 minutes. 5 ml of hydrogen peroxide was added and stirred in the ice bath for 1 hour. Approximately 1.4 liters of deionized water was added and the residue was collected by filtration. The residue is graphitic oxide.

Example 2

Coating of Graphitic Oxide on Photocatalytic Metal Substrate 5 mg of graphitic oxide obtained as described in Example 1 was dissolved in toluene (15 mL) and coated onto the $Pd/WO_3$ coated aluminum substrate (2 cm×2 cm) at a temperature of 10 degrees Celsius.

Example 3

Graphene Preparation

Figure 2:
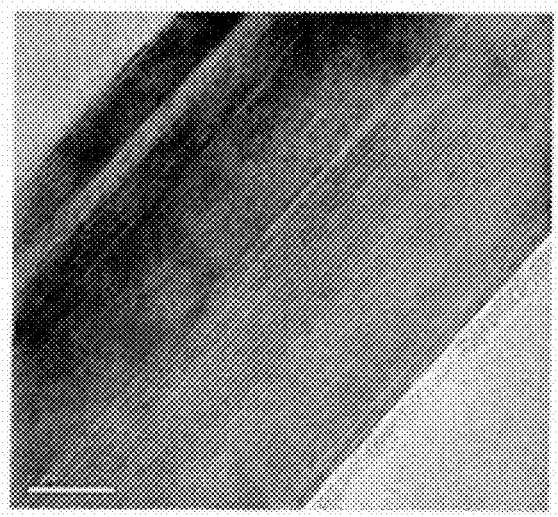
FIG. 2 shows SEM images of (A) several layers of graphitic oxide on Pd/WO$_3$ surface; (B) Single sheet of graphene exfoliated during exfoliation; and (C) single sheet of Graphene as separated.
Figure 2:
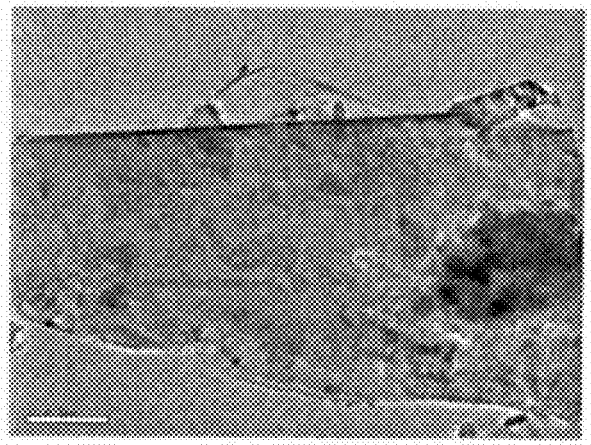
Figure 2:
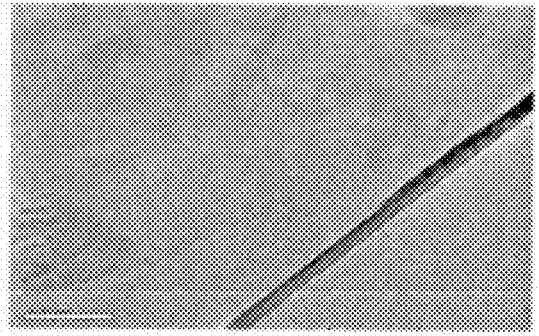
Figure 3:
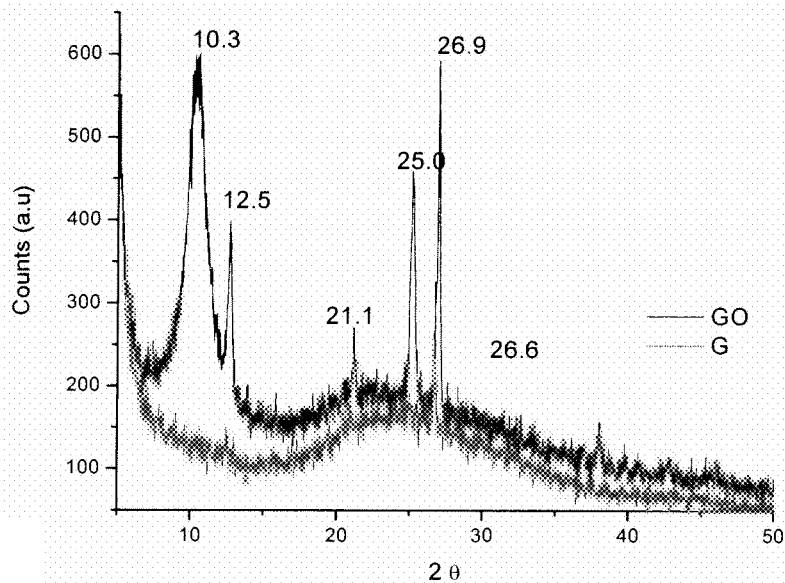
FIG. 3A shows a XRD spectrum of graphitic oxide and graphene. The upper line is graphitic oxide, and the lower line is graphene.
FIG. 3B shows an EDAX spectrum of graphene sheets.
Figure 3:
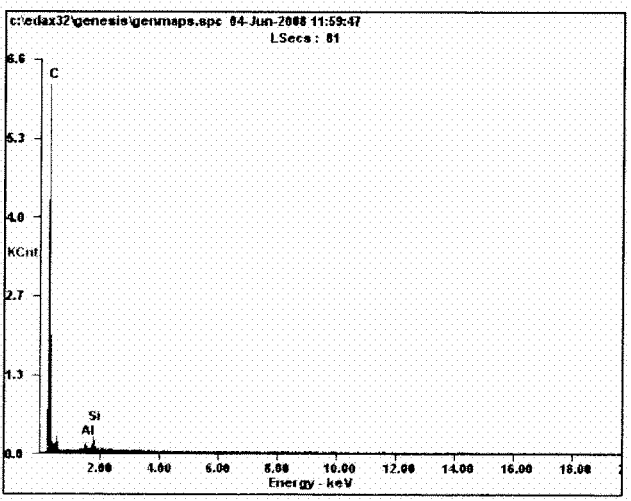

The graphitic oxide coated photocatalytic metal substrate that was prepared according to Example 2 was placed in a chamber containing argon (1 atm pressure) and oxygen (0.9 atm pressure). The chamber temperature was increased to 50 degrees Celsius slowly at a rate of about 5 degrees Celsius per minute. The composition was maintained at the temperature for about 10-15 minutes and then exposed to visible light. For $Pd/WO3$ the lights had a band gap 3.5 eV for 400 nm of 80 mJ energy. The electrical conductivity of the resulting material was measured and found to exhibit high electrical conductivity ($1.3 \times 10^3$ S/m). This is believed to reflect the retrieval of the lost conjugated $sp^2$ electrons. Without being bound to any theory, the high electrical conductivity can be explained by the fact that there is no residual oxygen in the final product because most of the oxygen is used for oxidation of toluene. Purity can be improved by using high purity metals and ensuring uniform coating of the photocatalytic metal substrate. FIGS. 2A, 2B, and 2C show the graphitic oxide has number of graphene sheets and oxygen molecules are present interlayer's of the sheets, which can be exfoliated by catalytic as well as evaporation of volatile solvents. During the exfoliation each sheets can be making bonds at the edge of the each sheets by coordination of the carbon molecules and expanded the sheet lengths. FIGS. 3A and 3B show the XRD and EDAX spectrum of the graphene. An elemental analysis showed that the composition of graphene has only carbon no other materials were present (Si and Al were detected, but these were from the substrate holder peak).

Example 4

Preparation of Photocatalytic Metal Substrate.

An aluminum (2 $cm^2$) plate was cleaned using sonication and subsequently passivated with nitrogen gas. A thin film (1 micron) of $Pd/WO_3$ was deposited on the plate using sol-gel or sputtering method. 2 grams of $Pd/WO_3$ was deposited by sol-gel method by mixing with 150 ml of ethanol. The solution was coated on the aluminum surface and heated to 100 degrees Celsius to obtain the photocatalytic metal substrate.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 members refers to groups having 1, 2, or 3 members. Similarly, a group having 1-5 members refers to groups having 1, 2, 3, 4, or 5 members, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method of preparing graphene, the method comprising:
    contacting a graphitic oxide composition with a photocatalytic-coated metal substrate or a photocatalytic-coated silicon wafer to yield graphene, wherein the graphitic oxide composition comprises graphitic oxide and an organic solvent.

2. The method of claim 1, the method further comprising preparing the graphitic oxide composition, the method of preparing the graphitic oxide composition comprising:
    dissolving graphite in a concentrated acid to produce an graphite-acid solution;
    contacting the graphite-acid solution with a nitrate or salt thereof to yield a graphite-acid-nitrate solution;
    contacting the graphite-acid-nitrate solution with an oxidizer to yield the graphitic oxide;
    purifying the graphitic oxide; and
    dissolving the purified graphitic oxide in the organic solvent to produce the graphitic oxide composition.

3. The method of claim 2, wherein the oxidizer is hydrogen peroxide, hydrazine, persulfuric acid, perchlorate, hypochlorite, or any combination thereof.

4. The method of claim 2, wherein the nitrate is potassium nitrate, ammonium nitrate, sodium nitrate, or any combination thereof.

5. The method of claim 2, wherein the acid is sulfuric acid, nitric oxide, or any combination thereof.

6. The method of claim 2, wherein the graphite is dissolved in a concentrated acid at a pH of less than or equal to 2.0.

7. The method of claim 2, wherein the graphite-acid solution is contacted with a nitrate or salt thereof in an ice bath to yield the graphite-acid-nitrate solution.

8. The method of claim 2, wherein the graphitic oxide is purified by filtering the graphitic oxide to yield purified graphitic oxide.

9. The method of claim 1, wherein the organic solvent is toluene, ethyl acetate, glycol ether, acetone, or any combination thereof.

10. The method of claim 1, wherein the graphitic oxide composition is coated on the photocatalytic coated metal substrate or the photocatalytic-coated silicon wafer.

11. The method of claim 10, wherein the photocatalytic coated metal substrate or the photocatalytic-coated silicon wafer is coated with the graphitic oxide composition by spin coating the photocatalytic coated metal substrate or the photocatalytic-coated silicon wafer with the graphitic oxide composition.

12. The method of claim 1, wherein the photocatalytic is $Pd/WO_3$, $ZnO$, $Ru$, $TiO_2$, $Pt$, or any combination thereof.

13. The method of claim 1, wherein the metal substrate is an aluminum substrate, copper substrate, silver substrate, iron substrate, zinc substrate, or any combination thereof.

14. The method of claim 1, further comprising heating the graphitic oxide composition and the photocatalytic-coated metal substrate or the photocatalytic-coated silicon wafer to a temperature of about 45° C. to 85° C.

15. The method of claim 14, wherein the graphitic oxide composition and the photocatalytic-coated metal substrate or the photocatalvtic-coated silicon wafer is heated to the temperature of about 45° C. to 85° C. at a rate of about 5° C. per minute.

16. The method of claim 14, wherein the graphitic oxide composition and the photocatalytic-coated metal substrate or the photocatalvtic-coated silicon wafer is maintained at a temperature of about 45° C. to 85° C. for about 5 to about 20 minutes.

17. The method of claim 1, wherein the graphitic oxide composition is reacted with a photocatalytic coated metal substrate or the photocatalvtic-coated silicon wafer by exposing the graphitic oxide composition and the photocatalytic-coated metal substrate or the photocatalytic-coated silicon wafer to light to yield the graphene.

18. The method of claim 17, wherein the graphitic oxide composition is reacted with the photocatalytic-coated metal substrate or the photocatalvtic-coated silicon wafer by contacting the graphitic oxide and the photocatalytic-coated metal substrate or the photocatalytic-coated silicon wafer with oxygen ($O_2$) in the presence of an inert gas at a temperature of about 45° C. to 85° C.

19. The method of claim 1, further comprising isolating the graphene.

20. The method of claim 1, wherein the graphene is a sheet of graphene.

21. The method of claim 1, wherein the graphene has high electrical conductivity.

22. The method of claim 1, wherein the graphitic oxide composition is graphic oxide dissolved in the organic solvent.

* * * * *